(12) United States Patent
Cho et al.

(10) Patent No.: US 12,481,201 B2
(45) Date of Patent: Nov. 25, 2025

(54) FLEXIBLE INFRARED SELECTIVE EMITTER AND MANUFACTURING METHOD THEREOF

(71) Applicant: UIF (University Industry Foundation), Yonsei University, Seoul (KR)

(72) Inventors: Hyung Hee Cho, Seoul (KR); Namkyu Lee, Gyeonggi-do (KR); Joon-Soo Lim, Gyeongsangbuk-do (KR); Injoong Chang, Seoul (KR); Juyeong Nam, Seoul (KR); Hyung Mo Bae, Seoul (KR); Maroosol Yun, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 418 days.

(21) Appl. No.: 18/087,755

(22) Filed: Dec. 22, 2022

(65) Prior Publication Data
US 2023/0221618 A1 Jul. 13, 2023

(30) Foreign Application Priority Data
Jan. 11, 2022 (KR) .................. 10-2022-0003764

(51) Int. Cl.
*G02F 1/39* (2006.01)
*F41H 3/02* (2006.01)
*G02B 1/00* (2006.01)

(52) U.S. Cl.
CPC ............... *G02F 1/39* (2013.01); *G02B 1/002* (2013.01); *F41H 3/02* (2013.01)

(58) Field of Classification Search
CPC ................. G02F 1/39; G02B 1/002; G02B 5/281; F41H 3/02; H01Q 17/007
See application file for complete search history.

(56) References Cited

U.S. PATENT DOCUMENTS

| 2017/0338567 | A1* | 11/2017 | Puscasu ............... G01J 5/024 |
| 2018/0069319 | A1* | 3/2018 | Cho ....................... B32B 3/14 |
| 2022/0257963 | A1 | 8/2022 | Cheon et al. |
| 2022/0257964 | A1 | 8/2022 | Cheon et al. |
| 2022/0259583 | A1 | 8/2022 | Cheon et al. |

(Continued)

FOREIGN PATENT DOCUMENTS

KR 10-1894909 11/2016

OTHER PUBLICATIONS

Cao et al., "Wideband mid-infrared thermal emitter based on stacked nanocavity metasurfaces," Int. J. Extrem. Manuf. (2022) 4; 015402.

(Continued)

*Primary Examiner* — Jia X Pan
(74) *Attorney, Agent, or Firm* — Sughrue Mion, PLLC

(57) ABSTRACT

The present invention provides an infrared selective emitter in which since infrared energy can be emitted in a desired wavelength band by adjusting a metamaterial having a repeating structure on a plane, infrared camouflage is possible by attaching to the surface of the shape of an object to be camouflaged, and at the same time, the infrared selective emitter has flexible characteristics that can be applied to curved surfaces without limitations on the shape of an object.

2 Claims, 7 Drawing Sheets

(56) References Cited

U.S. PATENT DOCUMENTS

2022/0267606 A1    8/2022  Park et al.
2023/0314677 A1*  10/2023  Cho ..................... G02B 5/281
                                                            359/350

OTHER PUBLICATIONS

Lee et al., "Multiple Resonance Metamaterial Emitter for Deception of Infrared Emission with Enhanced Energy Dissipation," ACS Appl Mater Interfaces. (2020) 12(7):8862-8869.
Zhan et al., "Rapid design of broadband absorption metasurfaces for selective tailoring of infrared radiation characteristics," J. Phys. D: Appl. Phys. (2021) 54; 415102.
U.S. Appl. No. 17/788,040, filed Jun. 22, 2022, by Yoon et al. (copy not provided) (Copy not submitted herewith pursuant to the waiver of 37 C.F. R. § 1.98(a)(2)(iii) issued by the Office on Sep. 21, 2004).
U.S. Appl. No. 17/847,022, filed Jun. 22, 2022, by Cho et al. (copy not provided) (Copy not submitted herewith pursuant to the waiver of 37 C.F. R. § 1.98(a)(2)(iii) issued by the Office on Sep. 21, 2004).
U.S. Appl. No. 18/073,317, filed Dec. 1, 2022, by Hwang et al. (copy not provided) (Copy not submitted herewith pursuant to the waiver of 37 C.F. R. § 1.98(a)(2)(iii) issued by the Office on Sep. 21, 2004).
Lee et al., "Flexible Thermocamouflage Materials in Supersonic Flowfields with Selective Energy Dissipation," ACS Applied Materials & Interfaces 2021 13 (36), 43524-43532.

* cited by examiner

FIG. 12
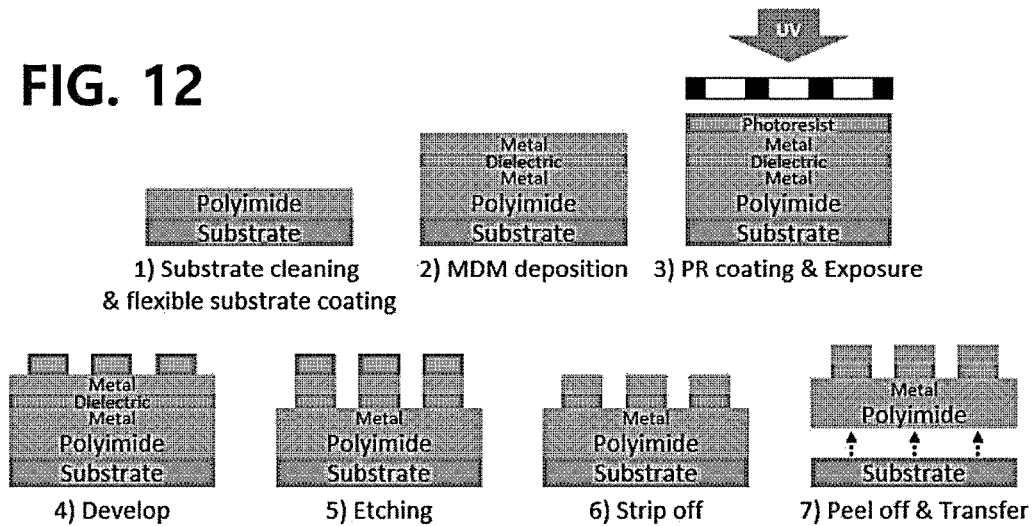
1) Substrate cleaning & flexible substrate coating
2) MDM deposition
3) PR coating & Exposure
4) Develop
5) Etching
6) Strip off
7) Peel off & Transfer
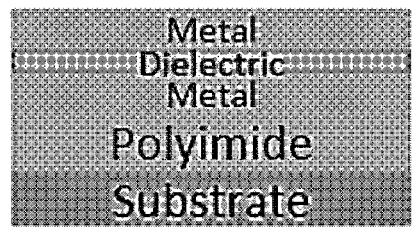
2) MDM deposition
FIG. 13
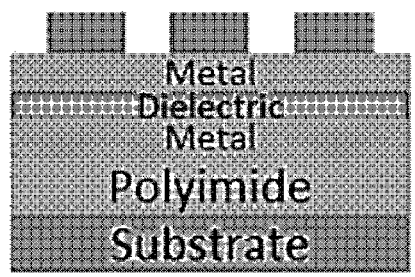
FIG. 14

FLEXIBLE INFRARED SELECTIVE EMITTER AND MANUFACTURING METHOD THEREOF

CROSS REFERENCE TO RELATED APPLICATION

The present application claims priority to and the benefit of Korean Patent Application No. 10-2022-0003764, filed Jan. 11, 2022, the disclosure of which is incorporated herein by reference in its entirety.

TECHNICAL FIELD

The present invention relates to a flexible infrared selective emitter.

BACKGROUND ART

In general, minimizing the signal detected by a target is referred to as the stealth technology. Recently, as a target detection method, the infrared technology for detecting an infrared signal along with an acoustic signal for detecting a submarine has been widely used. Accordingly, in order to minimize these various detection signals, various stealth technologies are being studied.

Particularly, in order to minimize the infrared signal so that it is not detected by the infrared detector, the technique of selectively emitting infrared rays by designing a surface emissivity to be high in the wavelength band with low atmospheric transmittance (5 to 8 µm) and a surface emissivity to be low in the atmospheric transmission window region with high atmospheric transmittance (3 to 5 µm and 8 to 14 µm) by lowering the temperature of the surface of a radiator emitting infrared rays or changing the structure of a surface has been introduced. However, in this case, there is a problem that it cannot be applied to curved surfaces with leading edges and the like, because brittle or rigid materials have to be used as the constituting materials. Considering that there are many devices with curved surfaces in the military industry where infrared selective emitters are mainly used, this has become a cause of greatly reducing the utilization of infrared selective emitters.

Accordingly, research on an infrared selective emitter is urgently required, in which infrared energy can be emitted in a desired wavelength band by adjusting a metamaterial having a repeating structure on a plane, and at the same time, it has flexible characteristics that can be easily applied to curved surfaces so as to greatly improve the utilization.

RELATED ART DOCUMENTS

Patent Documents (Patent Document 0001) Korean Registered Patent No. 10-1894909 (Aug. 29, 2018)

DISCLOSURE

Technical Problem

The present invention has been devised to overcome the above-described problems, and the problem to be solved by the present invention is directed to providing an infrared selective emitter in which infrared energy is emitted in a desired wavelength band by adjusting a metamaterial having a repeating structure on a plane to enable infrared camouflage, and at the same time, the infrared selective emitter has flexible characteristics that can be applied to curved surfaces, and a manufacturing method thereof.

Technical Solution

In order to solve the above-described problems, the present invention provides a flexible infrared selective emitter, including a substrate; a conductive thin film layer which is disposed on the substrate; and a meta-surface portion in which a plurality of structures in which an insulating layer and a metal layer are laminated are arranged to form a predetermined pattern on the conductive thin film layer.

In addition, according to an exemplary embodiment of the present invention, the emissivity may be 0.2 or less in infrared wavelength bands of 3 to 5 µm and 8 to 12 µm.

In addition, the insulating layer may be any one selected from silicon nitride ($Si_3N_4$), silicon oxide ($SiO_2$) and zinc sulfide (ZnS), wherein the thickness of the insulating layer may be 30 to 300 nm, wherein the size of the structure may be 1 to 3 µm, and wherein the thickness of the metal layer may be 50 to 400 nm.

In addition, the radius of curvature may be 250 µm or more.

In addition, the present invention provides a method for manufacturing a flexible infrared selective emitter, including the steps of (1) sequentially forming a conductive thin film layer, an insulating layer and a metal layer on a substrate; (2) forming a mask pattern layer having a predetermined pattern on the metal layer; and (3) forming a meta-surface portion by etching to the insulating layer along the mask pattern layer such that a plurality of structures in which an insulating layer and a metal layer are laminated on a conductive thin film layer form a predetermined pattern.

Advantageous Effects

According to the present invention, it is possible to manufacture an infrared selective emitter in which since infrared energy can be emitted in a desired wavelength band by adjusting a metamaterial having a repeating structure on a plane, infrared camouflage is possible by attaching to the surface of the shape of an object to be camouflaged, and at the same time, the infrared selective emitter has flexible characteristics that can be applied to curved surfaces without limitations on the shape of an object.

DESCRIPTION OF DRAWINGS

FIGS. 12 to 14 are diagrams for describing the method for manufacturing a flexible infrared selective emitter according to the present invention.

MODES OF THE INVENTION

Figure 1:
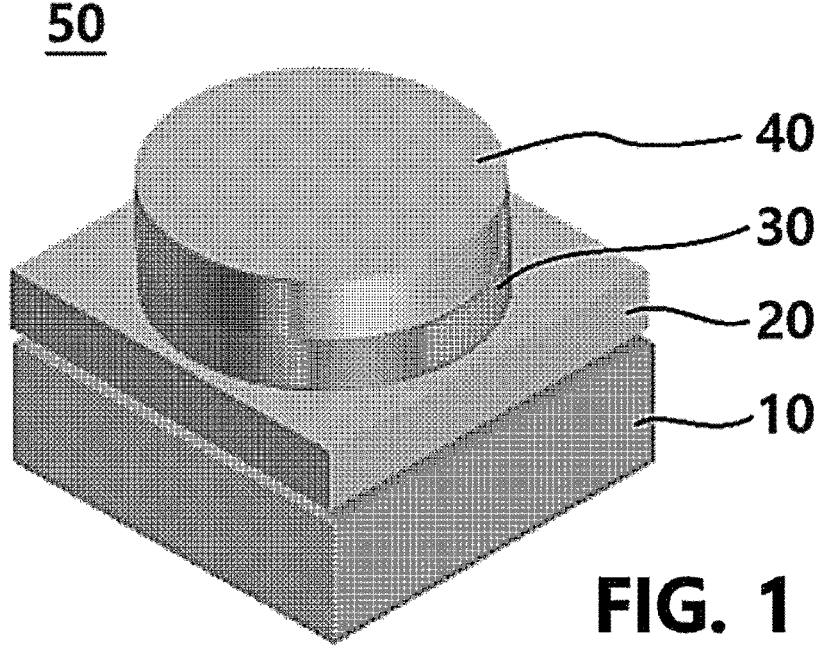
FIGS. 1 to 5 are diagrams showing the flexible infrared selective emitter according to the present invention.

Hereinafter, the exemplary embodiments of the present invention will be described in detail so that those skilled in the art can easily practice the present invention. The present invention may be embodied in many different forms and is not limited to the exemplary embodiments set forth herein.

As described above, the conventionally introduced infrared selective emitter has a problem in that it is difficult to apply to curved surfaces because a flexible material cannot be used.

Accordingly, the present invention has sought to solve the above-described problems by providing a flexible infrared selective emitter including a substrate, a conductive thin film layer which is disposed on the substrate, and a meta-surface portion in which a plurality of structures in which an insulating layer and a metal layer are laminated form a predetermined pattern on the conductive thin film layer.

Accordingly, since infrared energy can be emitted in a desired wavelength band by adjusting a metamaterial (structure) having a repeating structure on a plane, infrared camouflage is possible by attaching to the surface of an object to be camouflaged, and at the same time, it is possible to manufacture an infrared selective emitter having flexible characteristics that can be applied to curved surfaces without the limitation on the shape of an object.

Referring to FIGS. 1 to 5, the flexible infrared selective emitter according to the present invention will be described in detail.

The flexible infrared selective emitter 100 according to the present invention includes a substrate 10, a conductive thin film layer 20 which is disposed on the substrate 10, and a meta-surface portion 60 in which a plurality of structures 50 in which an insulating layer 30 and a metal layer 40 are laminated are arranged to form a predetermined pattern on the conductive thin film layer 20.

The substrate 10 serves as a structural material for physically supporting the flexible infrared selective emitter according to the present invention. In this case, the substrate 10 may have flexible characteristics such that it can be attached to the surface even when the surface of the material to be camouflaged has a curved shape. As a non-limiting example thereof, the substrate 10 may use a material having flexible properties such as quartz, glass, polydimethylsiloxane (PDMS), polyimide (PI), polyethylene terephthalate (PET) and the like, and preferably, polyimide may be used to control the thickness of the substrate within a desirable range by controlling the coating rpm, and it may be advantageous in reducing the radius of curvature because it has a relatively low viscosity compared to other materials and can be manufactured with a thin thickness. In addition, the substrate 10 may be in the form of a thin film capable of exhibiting sufficient flexibility, and although it is particularly limited, it may have a thickness of 100 nm to 10 mm.

Next, the conductive thin film layer 20 is formed on the substrate 10 and serves to impart conductivity to the flexible infrared selective emitter according to the present invention. Accordingly, the conductive thin film layer 20 may secure flexibility, and furthermore, a material having excellent electrical conductivity may be used, and although it is not particularly limited, it is preferable that the conductive thin film layer 20 is in the form of a thin film having a thickness sufficient to secure flexibility. In addition, as a non-limiting example thereof, the conductive thin film layer 20 may be made of an electrically conductive material such as gold (Au), silver (Ag), copper (Cu), aluminum (Al), indium tin oxide (ITO) or the like.

In addition, the conductive thin film layer 20 may have a thickness suitable for the purpose of the present invention while exhibiting sufficient flexibility, and although it is not particularly limited, as a non-limiting example thereof, when the conductive thin film layer 20 is made of gold, it may have a thickness of 200 nm to 1 μm.

Next, the flexible infrared selective emitter according to the present invention includes a meta-surface portion 60 in which a plurality of structures 50 in which an insulating layer 30 and a metal layer 40 are laminated are arranged to form a predetermined pattern on the conductive thin film layer 20.

Generally, in the case of an infrared camouflage material, the effect of reducing an infrared signal in a desired band is achieved by using the resonance phenomenon or resonance wavelength characteristics of a metal layer formed on the infrared camouflage material. Accordingly, the metal layer formed on the conventional infrared camouflage material has a brittle or rigid physical property, which is an inherent property of metal, and due to this property, there is a problem in that it is difficult to manufacture or process to fit the shape of a material to be camouflaged. In addition, due to the properties of the metal as described above, there is a problem in that it is difficult to easily apply the infrared camouflage material when the material to be camouflaged has a curved surface even if it is manufactured in a desired size. For example, infrared camouflage materials may be mainly used for airplanes in the military field, and in this case, when the airplanes in the military field have a curved surface, it is difficult to process and transform the same to fit thereto, which greatly reduces actual utilization.

Accordingly, the flexible infrared selective emitter according to the present invention may implement an infrared selective emitter having a flexible structure by including a meta-surface portion 60 in which a plurality of structures 50 in which an insulating layer 30 and a metal layer 40 are laminated are arranged to form a predetermined pattern on the conductive thin film layer 20.

Figure 2:
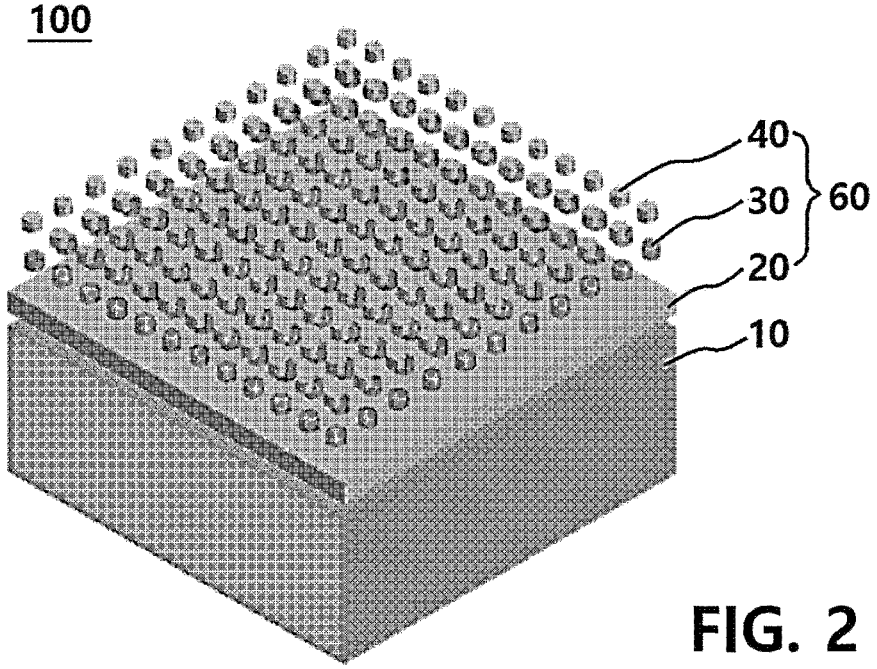
Figure 3:
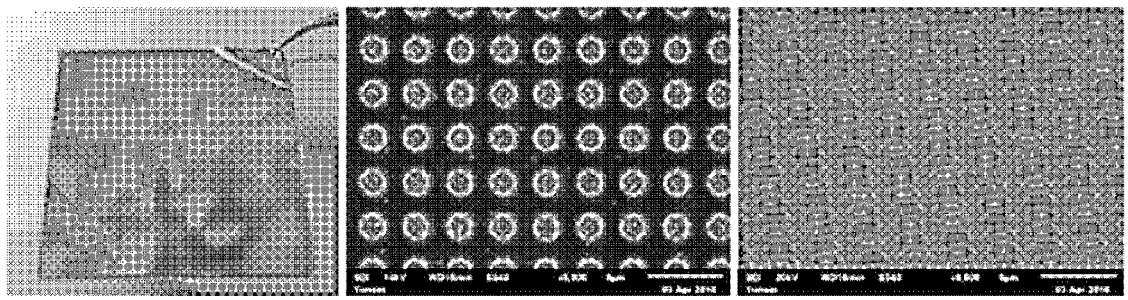
Figure 4:
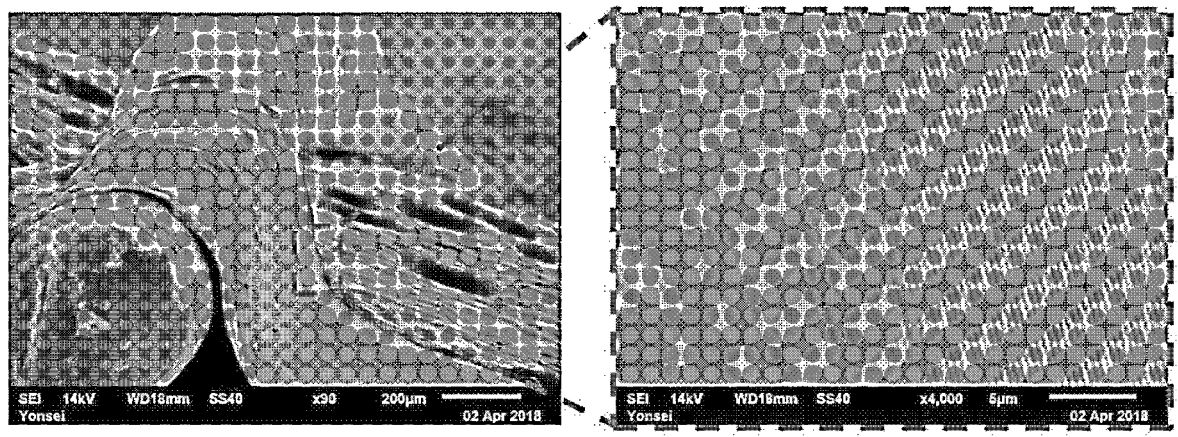
Figure 5A:
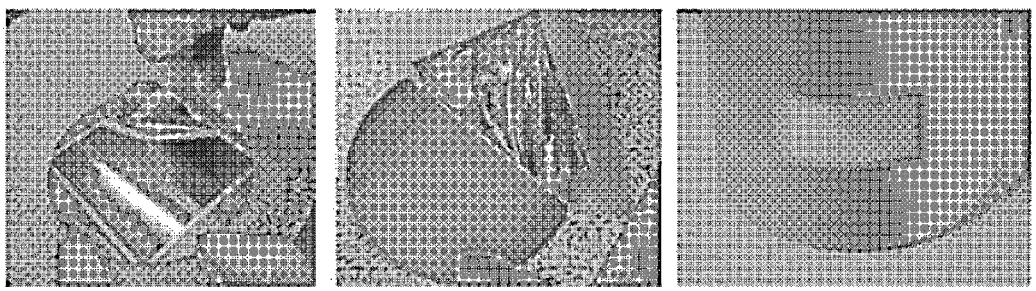

More specifically, referring to FIGS. 2 and 3, in the flexible infrared selective emitter 100 according to the present invention, a meta-surface portion 60 is formed on the conductive thin film layer 20, and the meta-surface portion 60 has a structure in which a plurality of structures 50 are arranged to form a predetermined pattern. Since the plurality of structures 50 are segmented to form a predetermined pattern, even if the flexible infrared selective emitter 100 according to the present invention is bent to form a curved surface, the resulting stress may be dispersed to impart flexibility. That is, the above-described substrate 10 and the conductive thin film layer 20 are formed of a material having flexibility in itself, and the meta-surface portion 60 may have enough flexibility to be attached to an object having a curved surface as illustrated in FIGS. 4 and 5 by using the segmented patterns of the plurality of structures 50. After all, in the present invention, due to the meta-surface portion 60 having such a segmented pattern, the flexible infrared selective emitter 100 according to the present invention may have a radius of curvature of 250 μm or more. In this case, if the radius of curvature is less than 250 μm, it may be difficult to secure sufficient flexibility for the purpose of the present invention.

Meanwhile, the plurality of structures 50 have a structure in which an insulating layer 30 and a metal layer 40 are laminated.

In general, the conventionally introduced infrared selective emitter includes an insulating layer (or dielectric layer) made of a brittle material, and exhibits radio wave absorption performance by controlling impedance using a carbon-based dielectric loss material. Dielectric loss materials can convert electromagnetic waves into thermal energy through Joule heating, and in this case, the real part of the permittivity corresponds to a capacitor in the circuit, and the imaginary part corresponds to resistance. That is, as the imaginary part of the dielectric constant is higher, more radio wave absorption can be expected in general, and this is called dielectric loss. Infrared camouflage materials using such dielectric loss are generally brittle materials and have inflexibility due to their structural characteristics, and thus, there is a limitation in that it is impossible to apply to curved surfaces.

Accordingly, the present invention has the structure of a meta-material in which a plurality of structures 50 are laminated on the meta-surface portion 60, and the thickness, repetition pitch and size of the pattern (metal layer) of the plurality of structures 50 may be adjusted to reduce infrared signals in a wavelength band used for infrared detection by infrared selective emission characteristics.

More specifically, the flexible infrared selective emitter 100 according to the present invention may adjust the emissivity and wavelength band by controlling the size of the structure 50 formed to have a constant pattern on the meta-surface portion 60.

Figure 6:
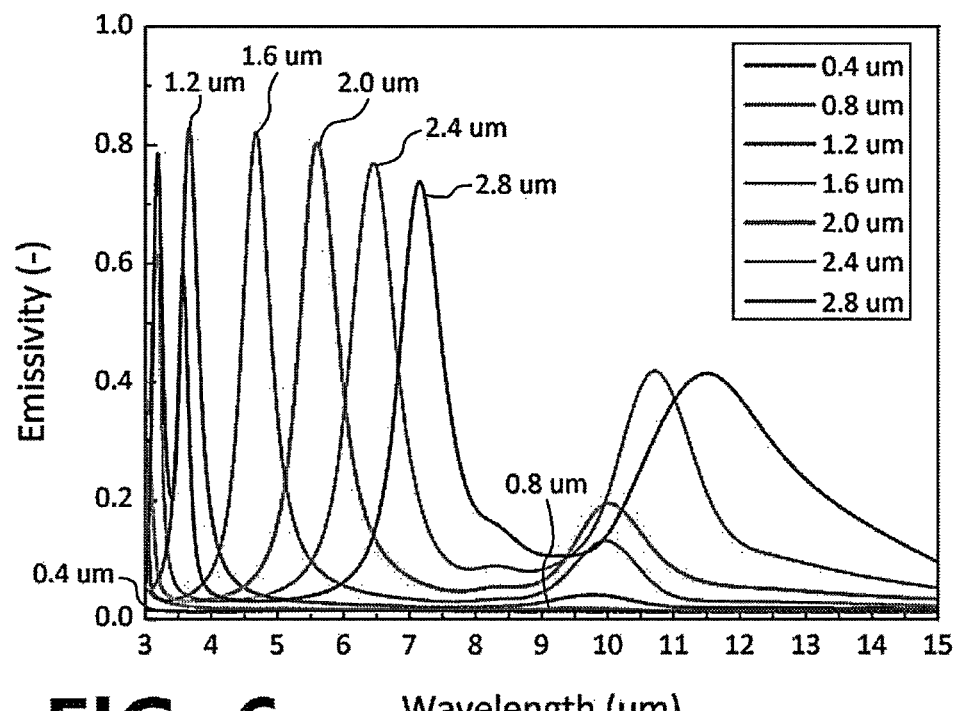
FIGS. 6 and 7 are graphs showing the control of the size of a structure included in the flexible infrared selective emitter according to an exemplary embodiment of the present invention.

That is, referring to FIG. 6, according to an exemplary embodiment of the present invention, when the insulating layer 30 included in the circular structure 50 is formed of $SiO_2$ and the thicknesses of the material of the metal layer 40 formed on the upper surface of the insulating layer 30 and the insulating layer are formed to be constant, it can be seen that by adjusting the size of the structure 50 to about 2.0 to 2.8 μm, infrared rays may be emitted in the atmospheric absorption band (5 to 8 μm), and emissivity may be reduced in other bands.

Figure 7:
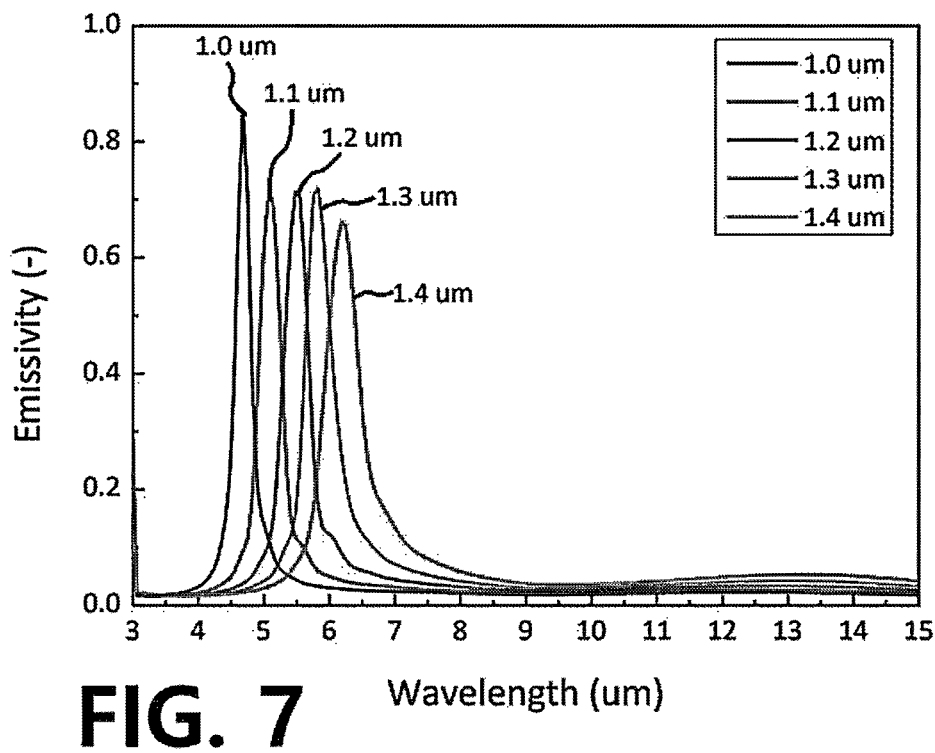

In addition, referring to FIG. 7, when the insulating layer 30 is formed of $Si_3N_4$ and the thicknesses of the material of the metal layer 40 formed on the upper surface of the insulating layer 30 and the insulating layer are formed to be constant, it can be seen that by adjusting the size of the structure 50 to about 1.4 to 1.6 μm, infrared rays may be emitted in the atmospheric absorption band, and emissivity may be reduced in other bands.

Meanwhile, the present invention may adjust the emissivity and wavelength band by controlling the thickness of the insulating layer 30.

Figure 8:
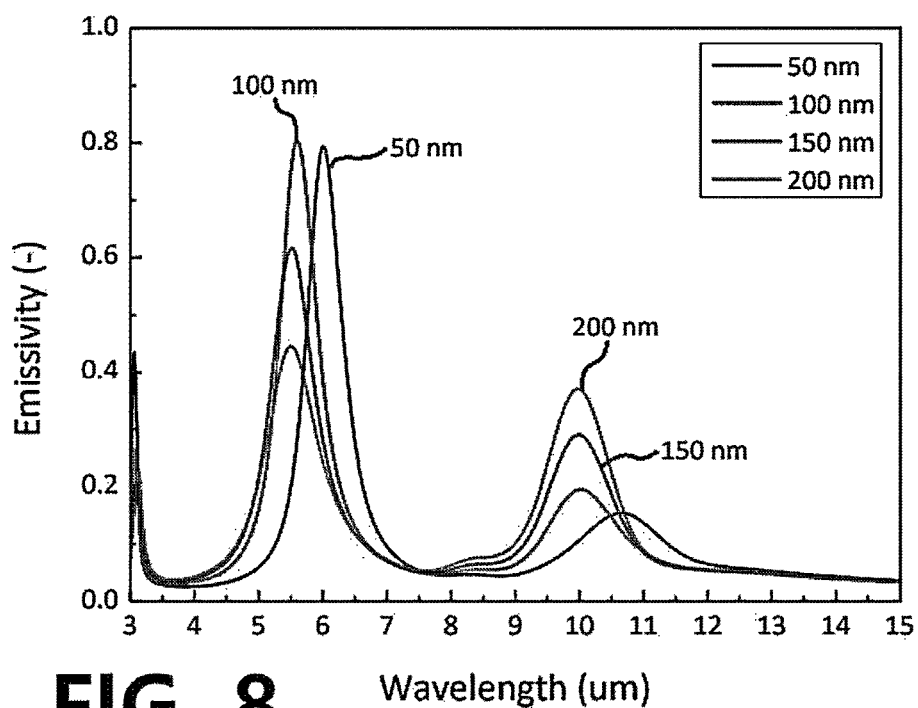
FIGS. 8 and 9 are graphs showing the control of the thickness of an insulating layer included in the flexible infrared selective emitter according to an exemplary embodiment of the present invention.

More specifically, referring to FIG. 8, when the insulating layer 30 is formed of $SiO_2$ and the sizes of the material of the metal layer 40 formed on the upper surface of the insulating layer 30 and the structure are formed to be constant, it can be seen that by adjusting the thickness of the insulating layer 30 to 100 to 200 nm, infrared rays may be emitted in the atmospheric absorption band (5 to 8 μm), and emissivity may be reduced in other bands.

Figure 9:
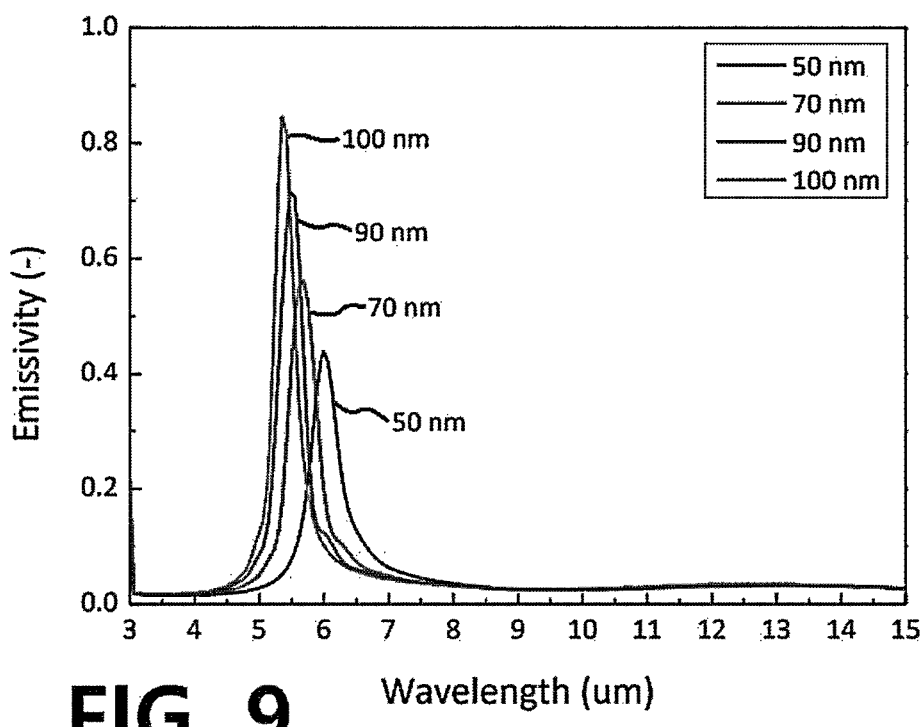

In addition, referring to FIG. 9, when the insulating layer 30 is formed of $Si_3N_4$ and the sizes of the material of the metal layer 40 formed on the upper surface of the insulating layer 30 and the structure are formed to be constant, it can be seen that by adjusting the thickness of the insulating layer 30 to 50 to 100 nm, infrared rays may be emitted in the atmospheric absorption band, and emissivity may be reduced in other bands.

To this end, for the insulating layer 30, a material with high permittivity in the infrared region may be used s the dielectric layer, and for example, silicon nitride ($Si_3N_4$), silicon oxide ($SiO_2$) or zinc sulfide (ZnS) may be used.

In addition, as described above, the thickness may be appropriately designed in consideration of the material used for the insulating layer 30, and as a non-limiting example according to an exemplary embodiment of the present invention, it may have a thickness of 30 to 300 nm.

Meanwhile, the present invention may adjust the emissivity and the wavelength band by controlling the thickness of the metal layer 40.

Figure 10:
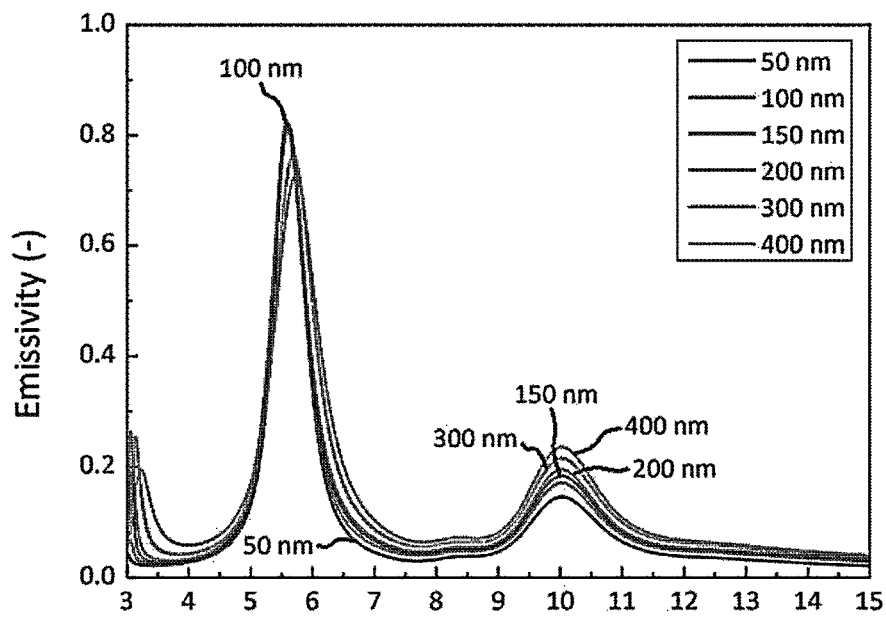
FIGS. 10 and 11 are graphs showing the control of the thickness of a metal layer included in the flexible infrared selective emitter according to an exemplary embodiment of the present invention.

More specifically, referring to FIG. 10, when the insulating layer 30 is formed of $SiO_2$, the metal layer 40 formed on the upper surface of the insulating layer 30 is formed of gold (Au), and the size of the structure 50 is formed to be constant, it can be seen that by adjusting the thickness of the metal layer 40 to 100 to 300 nm, infrared rays may be emitted in the atmospheric absorption band (5 to 8 μm), and emissivity may be reduced in other bands.

Figure 11:
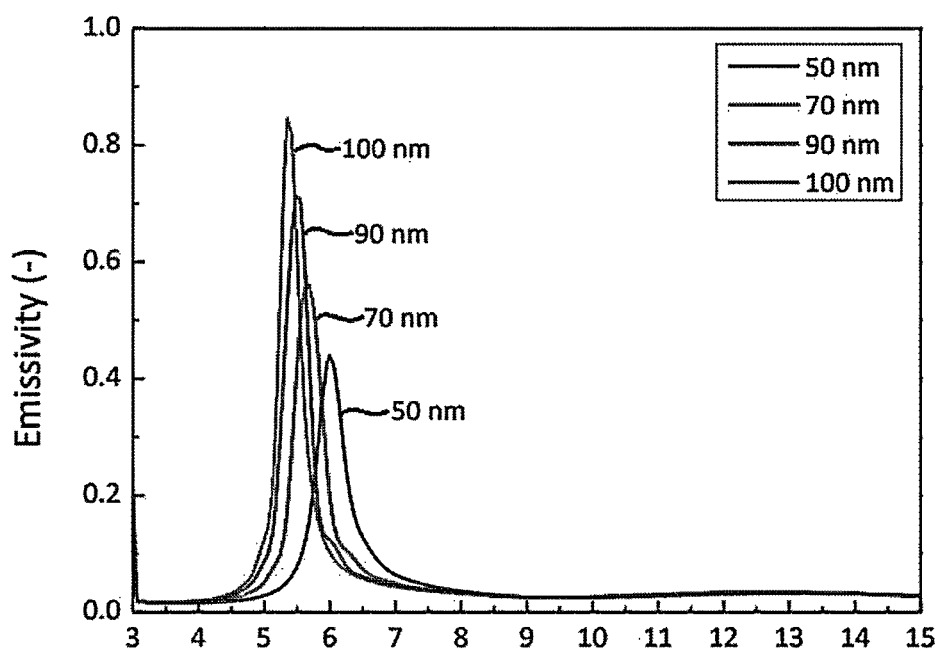

In addition, referring to FIG. 11, when the insulating layer 30 is formed of $Si_3N_4$, the metal layer 40 formed on the upper surface of the insulating layer 30 is formed of gold, and the size of the structure 50 is formed to be constant, it can be seen that by adjusting the thickness of the insulating layer 30 to 50 to 100 nm, infrared rays may be emitted in the atmospheric absorption band, and emissivity may be reduced in other bands.

To this end, the metal layer 40 may have a certain level of flexibility and may be a thin film made of gold (Au), silver (Ag), copper (Cu) or aluminum (Al).

In addition, as described above, the thickness may be appropriately designed in consideration of the material used for the metal layer 40 and the size of the structure 50, and as a non-limiting example according to an exemplary embodiment of the present invention, it may have a thickness of 50 to 400 nm.

Meanwhile, although only the size of the metal layer 40 has been described in the present specification, it is only an exemplary embodiment of the present invention, and infrared emissivity and radiation band may be controlled by adjusting the width, shape and spacing of the structure 50 and the width, shape and size of the insulating layer 30 and the metal layer 40 constituting the structure 50.

As described above, the flexible infrared selective emitter 100 according to the present invention may control the emissivity to 0.2 or less in the infrared wavelength bands of 3 to 5 μm and 8 to 12 μm by adjusting a metamaterial having a repeating structure on a plane, and infrared camouflage is possible by attaching to the surface of an object to be camouflaged, and at the same time, since it has flexible characteristics that can be applied to curved surfaces without limitation on the shape of an object, it may greatly improve the utilization in various industrial and military fields as an infrared camouflage material or stealth device.

Next, the method for manufacturing a flexible infrared selective emitter 100 according to the present invention will be described with reference to FIGS. 12 to 15. However, in order to avoid redundancy, the descriptions of parts having the same technical concept as the above-described flexible infrared selective emitter 100 will be omitted.

The flexible infrared selective emitter 100 according to the present invention is manufactured by including the steps of (1) sequentially forming a conductive thin film layer, an insulating layer and a metal layer on a substrate, (2) forming a mask pattern layer having a predetermined pattern on the metal layer, and (3) forming a meta-surface portion by etching to the insulating layer along the mask pattern layer such that a plurality of structures in which an insulating layer and a metal layer are laminated on a conductive thin film layer form a predetermined pattern.

Step (1) is a step of sequentially forming a conductive thin film layer, an insulating layer and a metal layer on the substrate.

More specifically, referring to FIG. 13, step (1) may sequentially deposit a board, a conductive thin film layer, an insulating layer and a metal layer on the substrate of the flexible infrared selective emitter 100 according to the present invention. In this case, as the deposition method, a known conventional deposition method suitable for the purpose of the present invention may be used, and for example, it may be performed through physical vapor deposition or chemical vapor deposition. Examples of physical vapor deposition or chemical vapor deposition include DC sputtering, magnetron sputtering, electron beam evaporation, thermal evaporation, laser molecular beam epitaxy (LMBE), pulsed laser deposition (PLD), vacuum deposition, atomic layer deposition (ALD) or plasma enhanced chemical vapor deposition (PECVD).

Next, step (2) is a step of forming a mask pattern layer having a predetermined pattern on the metal layer. The mask pattern layer may be formed by a known conventional method that meets the purpose of the present invention, and preferably, PR may be coated on the metal layer, and mask pattern layers which are spaced apart at predetermined intervals may be formed through UV exposure.

Next, step (3) is a step of forming a meta-surface portion by etching to the insulating layer along the mask pattern layer such that a plurality of structures in which an insulating layer and a metal layer are laminated on a conductive thin film layer form a predetermined pattern.

That is, step (3) is a step of removing a part where the mask pattern layer is not formed such that a structure in which the insulating layer and the metal layer are sequentially laminated under the mask pattern layer forms a predetermined pattern. In this case, the method for removing a part where the mask pattern layer is not formed may be used without particular limitation as long as it is a method commonly used in the art within the range of not damaging the structure in which the insulating layer and the metal layer are sequentially laminated, and for example, wet etching, dry etching or a combination thereof may be performed.

Hereinafter, the present invention will be described in more detail through examples, but the following examples are not intended to limit the scope of the present invention, which should be interpreted to aid understanding of the present invention.

Example 1—Manufacture of Flexible Infrared Selective Emitter (1) Sequentially Forming a Conductive Thin Film Layer, an Insulating Layer and a Metal Layer on a Substrate Polyimide which was diluted on a silicon wafer was spin-coated to fabricate the substrate at a size of 13 μm, and gold (Au) as the conductive thin film layer at a thickness of 200 nm, $Si_3N_4$ as the insulating layer at a thickness of 100 nm and gold (Au) as the metal layer at a thickness of 200 nm were sequentially deposited on the substrate by using the E-bean evaporator, PECVD and E-beam evaporator, respectively, to manufacture a laminated structure.

(2) Forming a Mask Pattern Layer Having a Predetermined Pattern on the Metal Layer A mask pattern layer having a circular meta-pattern at a diameter of 2 μm was formed on the laminated structure manufactured in step (1).

(3) Forming a Meta-Surface Portion by Etching to the Insulating Layer Along the Mask Pattern Layer Such that a Plurality of Structures in which an Insulating Layer and a Metal Layer are Laminated on a Conductive Thin Film Layer Form a Predetermined Pattern In the laminated structure manufactured in step (1) using the mask pattern layer of step (2), a meta-surface portion in which a plurality of structures in which the insulating layer and the metal layer were laminated were arranged to form a predetermined pattern was formed by etching the part where the mask pattern layer was not formed by using the inductively coupled plasma etching method.

Example 2—Manufacture of Flexible Infrared Selective Emitter

It was manufactured in the same manner as in Example 1, except that the material and thickness of the insulating layer, the thickness of the metal layer and the size of the structure composed of the insulating layer and the metal layer were changed as shown in Table 1 below.

TABLE 1

| Classification | | | Example 1 | Example 2 | Example 3 | Example 4 | Example 5 | Example 6 | Example 7 |
|---|---|---|---|---|---|---|---|---|---|
| Structure | Insulating layer | Material | $Si_3N_4$ | $Si_3N_4$ | $Si_3N_4$ | $Si_3N_4$ | $Si_3N_4$ | $Si_3N_4$ | $Si_3N_4$ |
| | | Thickness | 100 | 100 | 100 | 100 | 100 | 50 | 70 |
| | Metal layer | Thickness | 100 | 100 | 100 | 100 | 100 | 100 | 100 |
| | Size | | 1 | 1.1 | 1.2 | 1.3 | 1.4 | 1.4 | 1.4 |

| Classification | | | Example 8 | Example 9 | Example 10 | Example 11 | Example 12 | Example 13 | Example 14 |
|---|---|---|---|---|---|---|---|---|---|
| Structure | Insulating layer | Material | $Si_3N_4$ | $Si_3N_4$ | $Si_3N_4$ | $Si_3N_4$ | $Si_3N_4$ | $Si_3N_4$ | $SiO_2$ |
| | | Thickness | 90 | 100 | 100 | 100 | 100 | 100 | 150 |
| | Metal layer | Thickness | 100 | 100 | 50 | 70 | 90 | 10 | 200 |
| | Size | | 1.4 | 1.4 | 1.4 | 1.4 | 1.4 | 1.4 | 0.4 |

| Classification | | | Example 15 | Example 16 | Example 17 | Example 18 | Example 19 | Example 20 | Example 21 | Example 22 |
|---|---|---|---|---|---|---|---|---|---|---|
| Structure | Insulating layer | Material | $SiO_2$ | $SiO_2$ | $SiO_2$ | $SiO_2$ | $SiO_2$ | $SiO_2$ | $SiO_2$ | $SiO_2$ |
| | | Thickness | 150 | 150 | 150 | 150 | 150 | 150 | 50 | 100 |
| | Metal layer | Thickness | 200 | 200 | 200 | 200 | 200 | 200 | 200 | 200 |
| | Size | | 0.8 | 1.2 | 1.6 | 2 | 2.4 | 2.8 | 2 | 2 |

TABLE 1-continued

| Classification | | | Example 23 | Example 24 | Example 25 | Example 26 | Example 27 | Example 28 | Example 29 | Example 30 |
|---|---|---|---|---|---|---|---|---|---|---|
| Structure | Insulating layer | Material | SiO$_2$ | SiO$_2$ | SiO$_2$ | SiO$_2$ | SiO$_2$ | SiO$_2$ | SiO$_2$ | SiO$_2$ |
| | | Thickness | 150 | 200 | 150 | 150 | 150 | 150 | 150 | 150 |
| | Metal layer | Thickness | 200 | 200 | 50 | 100 | 150 | 200 | 300 | 400 |
| | | Size | 2 | 2 | 2 | 2 | 2 | 2 | 2 | 2 |

Experimental Example 1—Measurement of Infrared Emission Band and Emissivity

The infrared emission band and emissivity of the flexible infrared selective emitters manufactured in Examples 1 to 30 were measured by using Fourier Transform Infrared (FT-IR) equipment.

Experimental Example 2—Measurement of Radius of Curvature and Surface Adhesion Test After attaching the flexible infrared selective emitters manufactured in Examples 1 to 30 to a copper wire having a radius of curvature of 250 µm, it was confirmed that the meta-surface portion made of the insulating layer and the metal layer on the conductive thin film layer was not lost in a bent state by using a Scanning Electron Microscope (SEM).

Figure 5B:
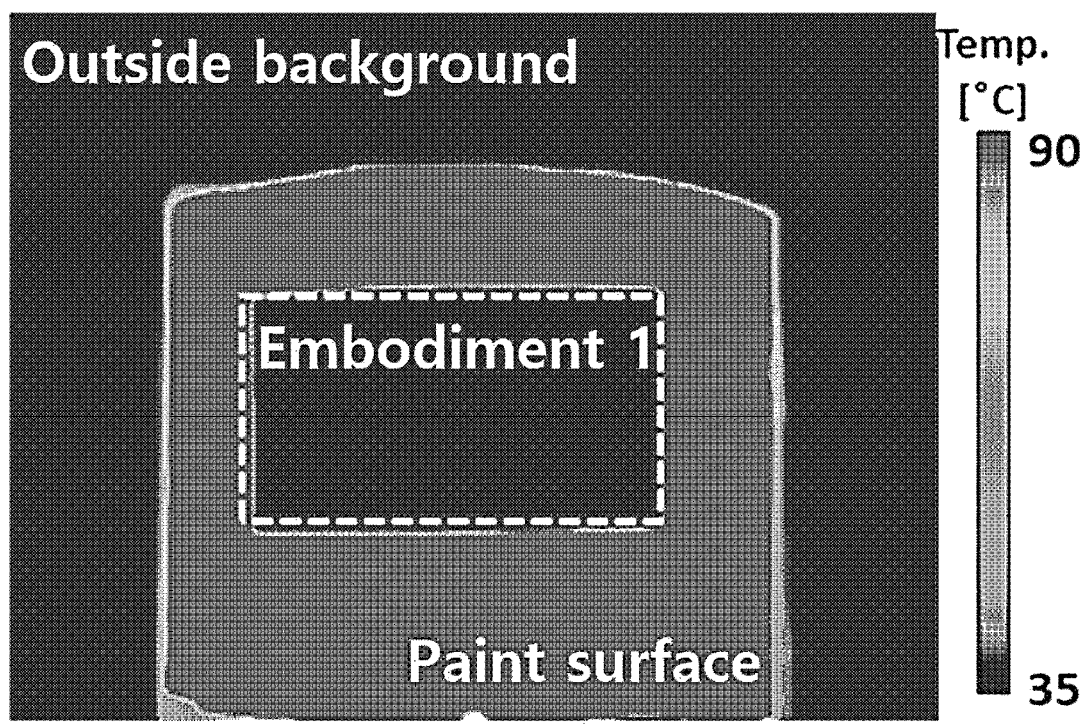

Experimental Example 3—Measurement of Infrared Signals after Attaching to Curved Surface The flexible infrared selective emitter manufactured in Example 1 was attached to an object having a radius of curvature of 5 cm, and the infrared signal was measured while the surface temperature was heated to 100° C., and the results are shown in FIG. 5b. It was confirmed that the infrared camouflage effect appeared even when it was attached to a curved surface because the infrared signals in the flexible structure metamaterial and the external background conditions were similar.

Referring to Table 1, it can be seen that the emissivity and the wavelength band may be adjusted by controlling the size of the structure 50 formed to have a constant pattern on the meta-surface portion 60 according to an exemplary embodiment of the present invention.

That is, referring to FIG. 6, according to an exemplary embodiment of the present invention, when the insulating layer 30 included in the circular structure 50 was formed of SiO$_2$ and the thicknesses of the material of the metal layer 40 formed on the upper surface of the insulating layer 30 and the insulating layer were formed to be constant, it can be seen that by adjusting the size of the structure 50 to about 2.0 to 2.8 µm, infrared rays may be emitted in the atmospheric absorption band (5 to 8 µm), and emissivity may be reduced in other bands.

In addition, referring to FIG. 7, when the insulating layer 30 was formed of Si$_3$N$_4$ and the thicknesses of the material of the metal layer 40 formed on the upper surface of the insulating layer 30 and the insulating layer were formed to be constant, it can be seen that by adjusting the size of the structure 50 to about 1.4 to 1.6 µm, infrared rays may be emitted in the atmospheric absorption band, and emissivity may be reduced in other bands.

In addition, through Table 1, it can be seen that the present invention may adjust the emissivity and the wavelength band by controlling the thickness of the insulating layer 30.

More specifically, referring to FIG. 8, when the insulating layer 30 was formed of SiO$_2$ and the sizes of the material of the metal layer 40 formed on the upper surface of the insulating layer 30 and the structure were formed to be constant, it can be seen that by adjusting the thickness of the insulating layer 30 to 100 to 200 nm, infrared rays may be emitted in the atmospheric absorption band (5 to 8 µm), and emissivity may be reduced in other bands.

In addition, referring to FIG. 9, when the insulating layer 30 was formed of Si$_3$N$_4$ and the sizes of the material of the metal layer 40 formed on the upper surface of the insulating layer 30 and the structure were formed to be constant, it can be seen that by adjusting the thickness of the insulating layer 30 to 50 to 100 nm, infrared rays may be emitted in the atmospheric absorption band, and emissivity may be reduced in other bands.

In addition, through Table 1, it can be seen that the present invention may adjust the emissivity and the wavelength band by controlling the thickness of the metal layer 40.

More specifically, referring to FIG. 10, when the insulating layer 30 was formed of SiO$_2$, the metal layer 40 formed on the upper surface of the insulating layer 30 was formed of gold (Au), and the size of the structure 50 was formed to be constant, it can be seen that by adjusting the thickness of the metal layer 40 to 100 to 300 nm, infrared rays may be emitted in the atmospheric absorption band (5 to 8 µm), and emissivity may be reduced in other bands.

In addition, referring to FIG. 11, when the insulating layer 30 was formed of Si$_3$N$_4$, the metal layer 40 formed on the upper surface of the insulating layer 30 was formed of gold, and the size of the structure 50 was formed to be constant, it can be seen that by adjusting the thickness of the insulating layer 30 to 50 to 100 nm, infrared rays may be emitted in the atmospheric absorption band, and emissivity may be reduced in other bands.

The invention claimed is:

1. A flexible infrared selective emitter, comprising:
    (a) a substrate;
    (b) a conductive thin film layer which is disposed on the substrate; and
    (c) a meta-surface portion in which a plurality of structures in which an insulating layer and a metal layer are laminated are arranged to form a predetermined pattern on the conductive thin film layer;
    wherein the insulating layer is any one selected from silicon nitride (Si$_3$N$_4$) and silicon oxide (SiO$_2$);
    wherein the metal layer is formed of gold (Au);
    wherein, when the insulating layer is silicon nitride, the thickness of the insulating layer is 50 to 100 nm;
    wherein, when the insulating layer is silicon oxide, the thickness of the insulating layer is 100 to 200 nm;
    wherein the thickness of the metal layer is 100 to 300 nm;
    wherein the size of the structure is 1 to 3 µm;
    wherein the emissivity is 0.2 or less in infrared wavelength bands of 3 to 5 µm and 8 to 12 µm; and
    wherein the flexible infrared selective emitter has a radius of curvature of 250 µm or more.

2. A method for manufacturing a flexible infrared selective emitter, comprising the steps of:
- (1) sequentially forming, on a substrate, a conductive thin film layer, an insulating layer selected from silicon nitride ($Si_3N_4$) and silicon oxide ($SiO_2$), and a metal layer formed of gold (Au) and having a thickness of 100 to 300 nm;
- (2) forming a mask pattern layer having a predetermined pattern on the metal layer; and
- (3) forming a meta-surface portion by etching to the insulating layer along the mask pattern layer such that a plurality of structures in which the insulating layer and the metal layer are laminated on the conductive thin film layer form the predetermined pattern;

wherein, when the insulating layer is silicon nitride, the thickness of the insulating layer is 50 to 100 nm;

wherein, when the insulating layer is silicon oxide, the thickness of the insulating layer is 100 to 200 nm;

wherein the size of the structure is 1 to 3 μm;

wherein the thicknesses of the insulating layer and the metal layer and the size of the plurality of structures are controlled such that the emissivity is 0.2 or less in infrared wavelength bands of 3 to 5 μm and 8 to 12 μm; and wherein the flexible infrared selective emitter has a radius of curvature of 250 μm or more.

* * * * *